Patented May 15, 1945

2,375,979

UNITED STATES PATENT OFFICE 2,375,979

PROCESS OF OBTAINING CHORIONIC GONADOTROPIC HORMONE

Edward A. Doisy, Webster Groves, and Philip A. Katzman, University City, Mo., assignors to President and Board of Trustees of St. Louis University, St. Louis, Mo.

No Drawing. Application March 20, 1942,
Serial No. 435,530

6 Claims. (Cl. 167—74)

This invention relates to a process for obtaining the chorionic gonadotropic hormone in concentrated and purified form.

Certain tissues and body fluids such as human placenta and human pregnancy urine contain a hormone designated as the chorionic gonadotropic hormone. Preparations of this hormone find wide applicability in the treatment of certain physiological malfunctionings.

An object of this invention is to provide a new and improved process for concentrating and purifying this hormone from its sources. A further object is to provide a new agent for selectively eluting the hormone from a solid adsorbent and away from its associated impurities.

It is known that the chorionic gonadotropic hormone can be adsorbed from its solutions or suspensions by various adsorbents. However, this hormone is present in such small quantities in the source material, e. g., urine of pregnancy, that large volumes of the latter must be handled in order to obtain appreciable yields. Furthermore, the natural source materials contain many contaminating substances which show a very strong tendency to accompany gonadotropic activity in all those steps of adsorption, desorption, or elution, precipitation, solution in solvents, etc., intended to purify and concentrate the activity. The presence of such impurities has made it necessary to use numerous long and tedious steps involving considerable expense in order to attain good yields of a highly potent product.

One of the most important problems in developing a simple commercially practicable method for obtaining high yields of a high potency gonadotropic hormone product is to find an agent capable in high degree of exercising a selective action on the desired hormone, in contrast to its action on the impurities associated with the hormone. For example, it is a relatively simple matter to adsorb gonadotropic hormone directly from human pregnancy urine onto a variety of adsorbents. However, it is another matter to remove the hormone from these adsorbents while leaving most of the impurities still attached thereto. For this reason, it has been necessary in the past to first precipitate or salt out a fraction from the crude source material before using an adsorbent. Furthermore, even when an adsorbent was used directly on the source material, no simple and effective method was known for working up the adsorbed product, largely because no really effective agent was known for selectively desorbing the activity.

We have found that an aqueous solution containing cations such as ammonium and sodium ions and certain proportions of water miscible organic solvent is capable of exercising a high degree of selective elution of gonadotropic hormone away from associated impurities when a solid adsorbent carrying an impure gonadotropic fraction is treated with said aqueous solution. We have further found that our new aqueous desorbing agent gives a simple and effective means for commercially obtaining high yields of high potency hormone product and that this is the case even when treating the product adsorbed directly from crude source material or human pregnancy urine.

Although various combinations of chemicals may be used to obtain an aqueous solution containing the desired cations, we prefer an ammonium salt of an organic acid which will not be precipitated by the organic solvent employed. Ammonium hydroxide may also be used but is not preferred because it extracts larger amounts of impurities. As a water miscible organic solvent, one can use acetone, dioxane and the like, or preferably a low aliphatic alcohol.

By means cf our new eluting agent it is possible to desorb the hormone by a neutral solution. Furthermore, when the hormone is precipitated from this solution by the further addition of the organic solvent the elution agent being soluble in the organic solvent does not contaminate the hormone.

Our new eluting agent is especially suitable for use in chromatographically purifying the hormone and especially when using an ion exchange type of adsorbent such as a zeolite or a synthetic resin having ion exchange properties.

The following example serves to illustrate the invention, although the materials and conditions can be varied considerably, as will be apparent to those skilled in the art, without departing from the scope of the invention as herein described and claimed.

Example

Human pregnancy urine which has been clarified by centrifuging, is acidified with glacial acetic acid to pH 3.5. This acidified urine is reclarified and is now percolated through a column of synthetic zeolite (permutit), as follows:

An adsorbent column suitable for this purpose may be prepared as follows: a 40 inch length of earthenware pipe 4 inches in internal diameter is set up vertically with a means for draining from the lower end. In this tube is introduced an 18 inch deep layer of 60-80 mesh permutit (according to Folin).

Urine is run into the column at such a rate as to maintain a head of 18 inches of fluid. Twenty-five to thirty gallons of urine are passed through the column in about eight hours, after which the rate of flow becomes quite slow due to clogging of the interstices of the column. At this point, it is advisable to interrupt the flow of urine and to flush the column by passing distilled water through it overnight (sixteen hours). For this purpose, about 10 gallons of water are used. The next day the column is again clear and another 25–30 gallons of urine may be passed through. In this manner urine is passed through the column for five consecutive days, with a distilled water washing of the column each night. After the final passage of urine, the column is washed with water (about 35 gallons) until the washings are substantially colorless and neutral to litmus.

To remove adsorbed impurities, a wash liquor prepared by mixing 4 gallons of 95% alcohol and 1 gallon of distilled water is run through the column until the washings are practically colorless. Then a second washing liquid (prepared by adding sufficient water to 6 pounds of ammonium acetate to make 6 quarts of solution and diluting the resulting solution with 6 gallons of 95% alcohol) is run through the column until the washings are practically colorless.

To remove the adsorbed hormone from the column, it is now eluted with a solution prepared by adding sufficient water to 1 kg. of ammonium acetate to give 6 liters of solution and then adding to this 4 liters of 95% alcohol. This makes the eluting solution have a strength of approximately 40% alcohol concentration. This is the preferred concentration when using ethyl alcohol. The eluate is collected in eight fractions as follows:

1. 500 cc.
2. 500 cc.
3. 1000 cc.
4. 1000 cc.
5. 1000 cc.
6. 1000 cc.
7. 500 cc.
8. 500 cc.

where the fraction No. 1 is the first fraction collected; No. 2 the second, and so on. Most of the hormone is present in the fractions numbered 3 to 6 which are the most highly colored. Sometimes 80% of the total activity may be found to reside in a single fraction. The hormone may be isolated from these fractions in several ways.

The active fractions may be worked up separately or in combination; for example, fractions 3–6 are combined and sufficient alcohol added so that the final solution contains equal volumes of alcohol and water. This solution will be called the primary solution.

A. If a product of maximum potency is desired, successive additions of alcohol equal in volume to half the volume of the primary solution are added to the latter, while separating the precipitate formed by each addition of alcohol. The fractionation is continued until the alcohol content of the filtrate is 85%. In this way about two to six fractions are obtained and the potency in each determined by assay.

B. To obtain all the activity in one precipitate of somewhat less potency than the maximum obtainable according to the method A above, the alcohol concentration of the primary solution is directly raised by adding in one step enough alcohol to attain an 85% concentration. The precipitated hormone thus obtained is separated and assayed.

The hormone preparations obtained according to either method A or B are treated further by washing with alcohol and acetone and then dried at room temperature in vacuo over $P_2O_5$. They may be purified further by extraction with 65 to 75% ethanol containing 10 to 15 per cent ammonium acetate to increase the solubility of the hormone and precipitation of the active material from the solution by addition of ethanol.

What we claim as our invention is:

1. In a process for obtaining the chorionic gonadotropic hormone from human pregnancy urine by adsorption of said hormone and associated impurities from said urine onto an ion exchange adsorbent and thereafter selectively desorbing and separating hormone away from impurities, the desorbing steps characterized by first desorbing mainly impurities from the adsorbent by means of a substantially neutral mixture of water and a high concentration of water-miscible organic solvent containing ammonium ions, and thereafter treating the adsorbent with a substantially neutral mixture of water and a relatively low concentration of water-miscible organic solvent containing ammonium ions, whereby mainly hormone is removed from the adsorbent.

2. In a process for obtaining the chorionic gonadotropic hormone from human pregnancy urine by adsorption of said hormone and associated impurities from said urine onto a zeolite adsorbent and thereafter selectively desorbing and separating hormone away from impurities, the desorbing steps characterized by first desorbing mainly impurities from the adsorbent by means of a substantially neutral mixture of water and a high concentration of water-miscible organic solvent containing ammonium ions, and thereafter treating the adsorbent with a substantially neutral mixture of water and a relatively low concentration, approximating one-half of said high concentration, of water-miscible organic solvent containing ammonium ions, whereby mainly hormone is removed from the adsorbent.

3. In a process for obtaining the chorionic gonadotropic hormone from human pregnancy urine by adsorption of said hormone and associated impurities from said urine onto a zeolite adsorbent and thereafter selectively desorbing and separating hormone away from impurities, the desorbing steps characterized by first desorbing mainly impurities from the adsorbent by means of a substantially neutral mixture of water and a high concentration of lower aliphatic alcohol containing ammonium ions, and thereafter treating the adsorbent with a substantially neutral mixture of water and a relatively low concentration, approximating one-half of said high concentration, of lower aliphatic alcohol containing ammonium ions, whereby mainly hormone is removed from the adsorbent.

4. In a process for obtaining the chorionic gonadotropic hormone from human pregnancy urine by adsorption of said hormone and associated impurities from said urine onto a zeolite adsorbent and thereafter selectively desorbing and separating hormone away from impurities, the desorbing steps characterized by first desorbing mainly impurities from the adsorbent by means of a substantially neutral mixture of water and a high concentration of ethyl alcohol containing ammonium ions, and thereafter treating the adsorbent with a substantially neutral mixture of water and a relatively low concentration, approximating one-half of said high concentration, of ethyl alcohol containing ammonium ions, whereby mainly hormone is removed from the adsorbent.

5. In a process for obtaining the chorionic gonadotropic hormone from human pregnancy urine by adsorption of said hormone and associated impurities from said urine onto a zeolite adsorbent and thereafter selectively desorbing and separating hormone away from impurities, the desorbing steps characterized by first desorbing mainly impurities from the adsorbent by means of a substantially neutral mixture of water and a high concentration of ethyl alcohol containing ammonium acetate, and thereafter treating the adsorbent with a substantially neutral mixture of water and a relatively low concentration, approximating one-half of said high concentration, of ethyl alcohol containing ammonium acetate, whereby mainly hormone is removed from the adsorbent.

6. In a process for obtaining the chorionic gonadotropic hormone from human pregnancy urine by adsorption of said hormone and associated impurities from said urine onto a zeolite adsorbent and thereafter selectively desorbing and separating hormone away from impurities, the desorbing steps characterized by first desorbing mainly impurities from the adsorbent by means of a substantially neutral mixture of water and alcohol of approximately 70% alcohol concentration containing an ammonium salt of an organic carboxylic acid soluble in alcohol, and thereafter treating the adsorbent with a substantially neutral mixture of water and alcohol containing about 40% of alcohol containing an ammonium salt of an organic carboxylic acid soluble in alcohol, whereby mainly hormone is removed from the adsorbent.

EDWARD A. DOISY.
PHILIP A. KATZMAN.